Oct. 28, 1958  J. R. HALL ET AL  2,857,740
TURBOJET AIRCRAFT ENGINE WITH THRUST AUGMENTATION
Filed Sept. 15, 1955  5 Sheets-Sheet 2
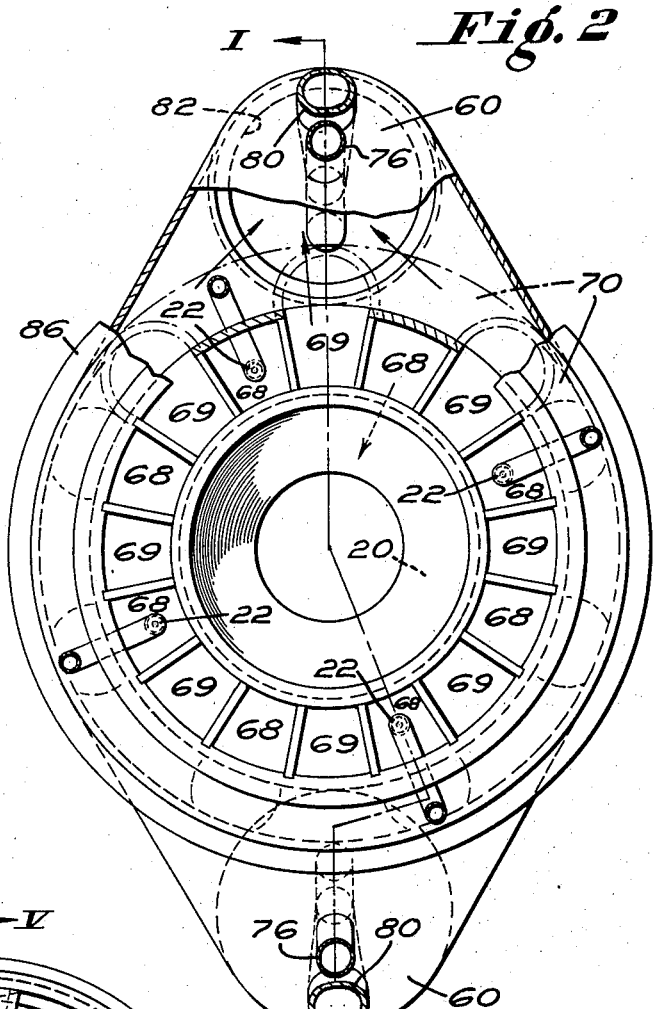
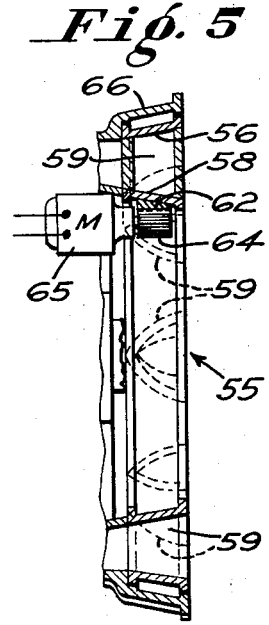
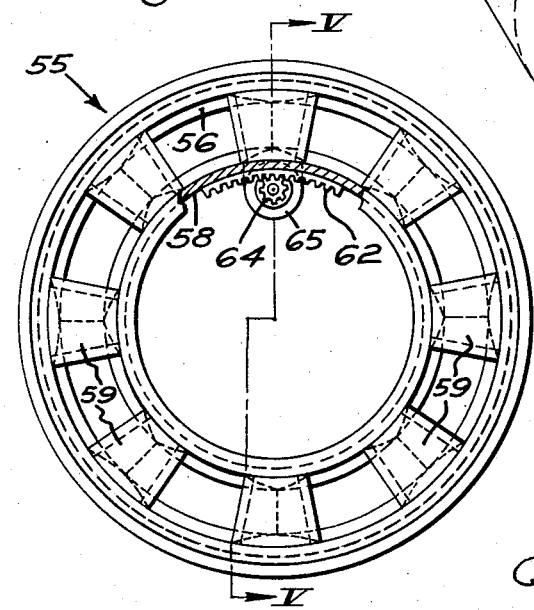
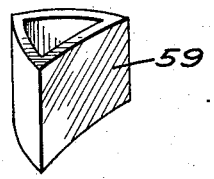
INVENTORS
JAMES R. HALL and
DIETRICH E. SINGELMANN
BY
Beau, Brooks, Buckley & Beau.
ATTORNEYS.

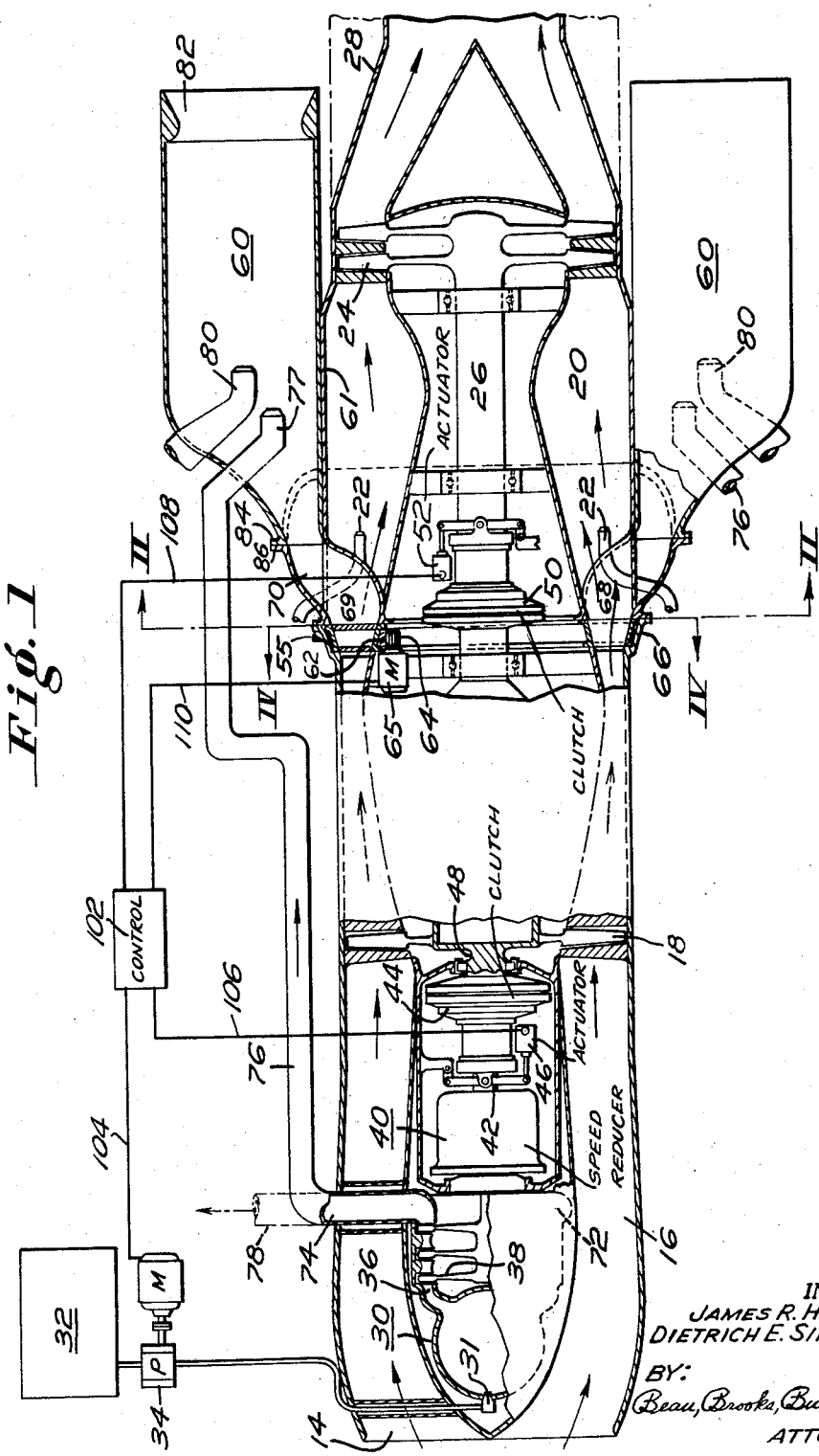

INVENTORS
JAMES R. HALL and
DIETRICH E. SINGELMANN
BY
Beau, Brooks, Buckley & Beau,
ATTORNEYS.

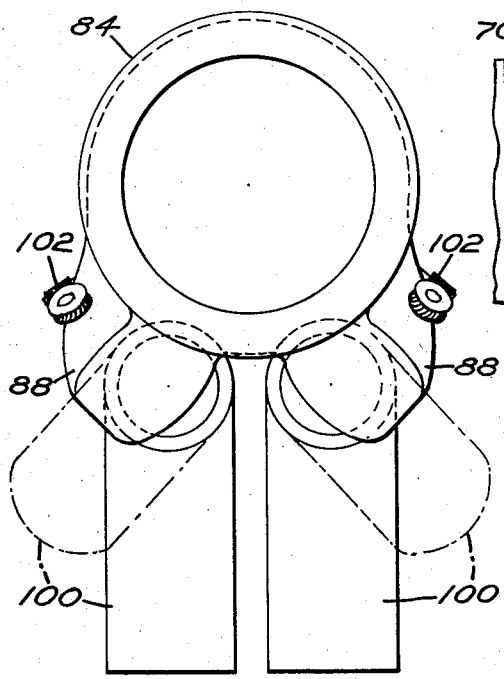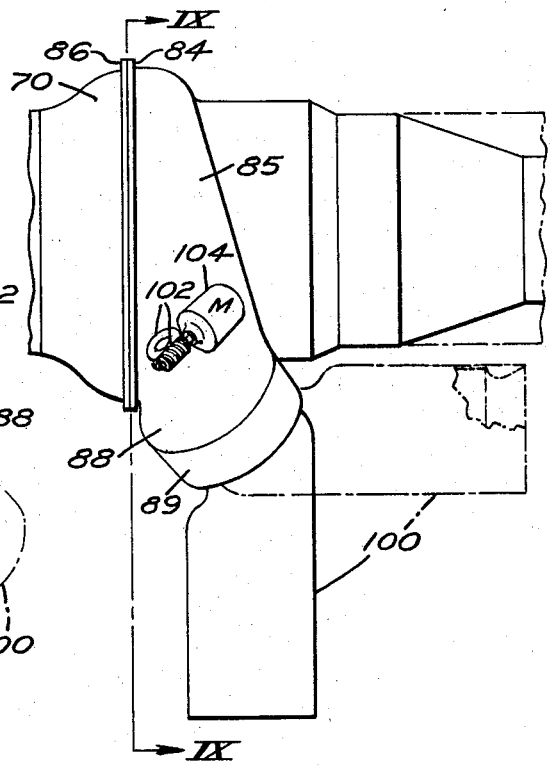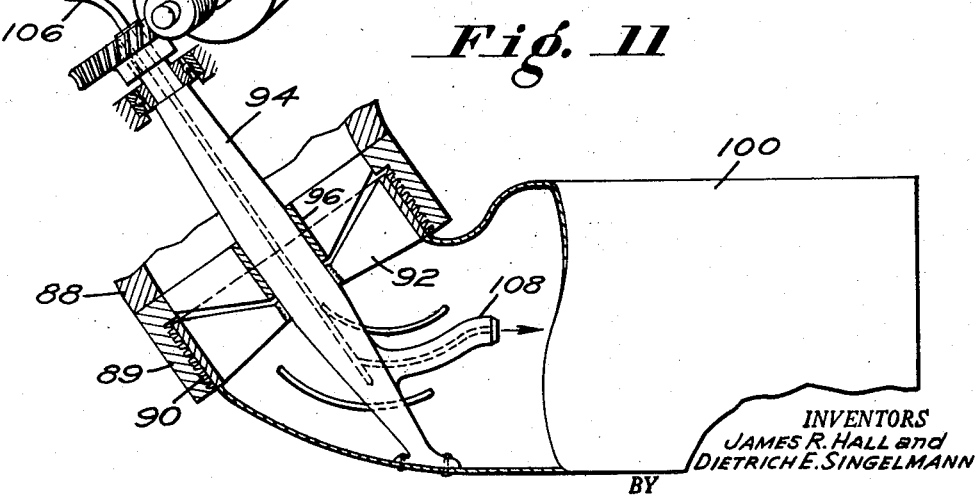

Oct. 28, 1958    J. R. HALL ET AL    2,857,740
TURBOJET AIRCRAFT ENGINE WITH THRUST AUGMENTATION
Filed Sept. 15, 1955    5 Sheets-Sheet 5
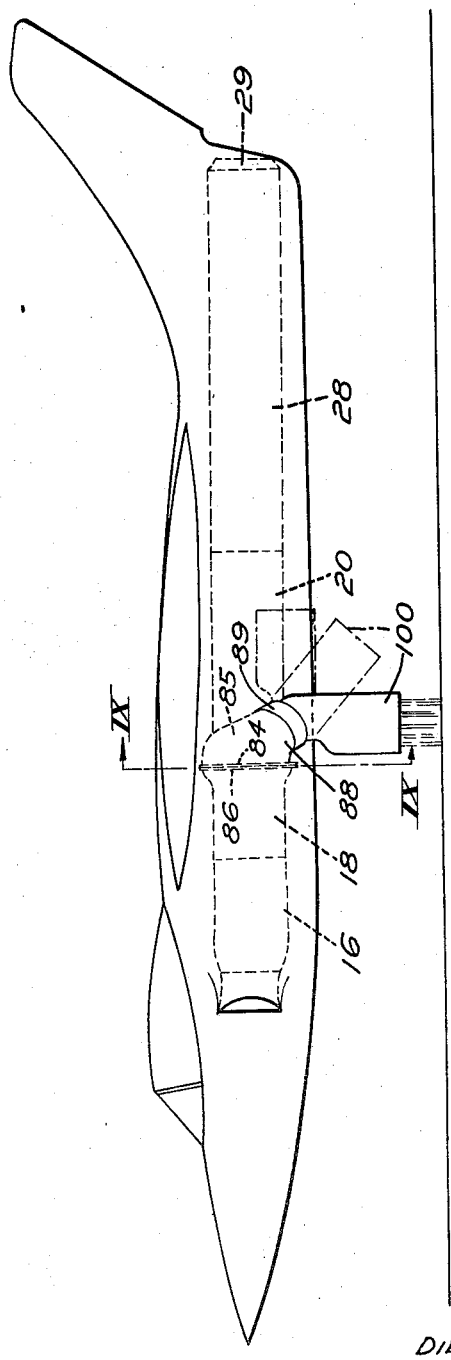
INVENTORS
JAMES R. HALL and
DIETRICH E. SINGELMANN
BY
Beau, Brooks, Buckley & Beau,
ATTORNEYS.

United States Patent Office 2,857,740
Patented Oct. 28, 1958

2,857,740

TURBOJET AIRCRAFT ENGINE WITH THRUST AUGMENTATION

James R. Hall, Sepulveda, Calif., and Dietrich E. Singelmann, Snyder, N. Y., assignors to Bell Aircraft Corporation, Wheatfield, N. Y.

Application September 15, 1955, Serial No. 534,421

9 Claims. (Cl. 60—35.6)

This invention relates to internal combustion gas turbine propulsion aircraft engines, and more particularly to an improved method and means for augmenting or "boosting" the thrust output of a turbojet engine, whereby a higher degree of thrust augmentation may be obtained than is obtainable from prior methods. One prior method has involved, for example, the use of water or water-alcohol mixtures injected into the engine compressor inlet or into the combustion chamber. Another method employs afterburners in which the turbine exhaust gases are reheated by the burning of additional fuel in the tailpipe before exhausting of the gas mixture from the jet exhaust nozzle. These methods are limited however, as to their degree of augmentation, by the basic engine cycle characteristics.

The present invention contemplates an improved engine arrangement wherein whenever high thrust augmentation is required, the entire compressor air flow is diverted through suitable valving to auxiliary thrust chambers. Thus, the main or regular combustion chamber, the main turbine, the tailpipe and the exhaust nozzle are bypassed. A separate gas generator and power turbine, supplied with a suitable chemical gas generant, is provided to then supply power to the compressor. Fuel is injected and burned in the auxiliary thrust chambers with the resulting hot gases expanding through their jet exhaust nozzles.

When thrust augmentation is unnecessary, the gas generator-turbine unit is shut down, and the compressor discharge air flow is routed through the primary combustion chamber, the main turbine, the tailpipe and the exhaust nozzle; and the engine then functions as a normal or conventional turbojet engine. Furthermore, the invention also contemplates an improved directionally variable thrust arrangement, thereby rendering it particularly applicable to good advantage, for example, in horizontal attitude vertical take-off and landing aircraft.

In the drawing:

Fig. 1 shows an engine of the invention with featured components in section;

Fig. 2 is a section, on an enlarged scale, taken along line II—II of Fig. 1;

Fig. 4 is a sectional view, on an enlarged scale, taken along line IV—IV of Fig. 1;

Fig. 5 is a fragmentary section taken along line V—V of Fig. 4;

Fig. 6 is a perspective view of a disassembled valve component of the device shown in Figs. 2, 3, 4, 5;

Fig. 9 is a section, on an enlarged scale, taken along line IX—IX of both Figs. 10 and 12, showing application of the engine to vertical take-off and landing horizontal attitude aircraft;

Fig. 10 is a fragmentary side view thereof;

Fig. 11 is a fragmentary elevational-sectional view of details of the mechanisms of Figs. 9–10; and Fig. 12 is a side view of an aircraft equipped with an engine of the invention.

Figure 7:
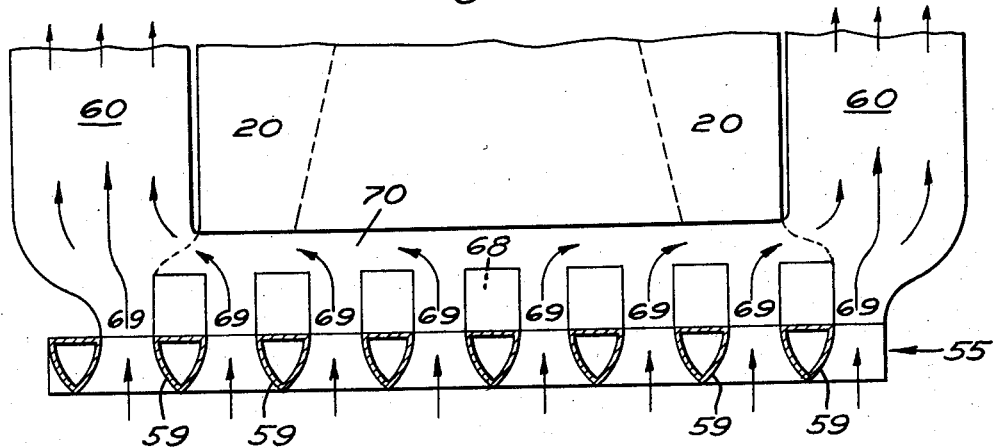
Figs. 7–8 are "developed" diagrammatic views of the valve device of Figs. 2, 3, 4, 5 in "high thrust augmentation" and in "normal turbojet" positions, respectively.

As shown in Fig. 1, an engine of the invention may be arranged so that for normal turbojet thrust operation, ambient air enters inlet duct 14 and passes through the annular intake duct 16 to the compressor 18. The engine primary combustion chamber is indicated at 20; fuel injection nozzles at 22; primary turbine 24; compressor-turbine shaft 26; and the primary turbine exhaust duct 28 which leads to the engine tail pipe and jet nozzle 29 (Fig. 12). It will be understood that the components so far described comprise features of a conventional turbojet engine.

In accord with the present invention however the basic engine as hereinabove described is supplemented by a gas generator chamber 30 which is illustrated to be of the rocket engine type and fed by a nozzle 31 from a supply tank 32 under pressure, as by means of a pump as indicated at 34. Any suitable mono or bipropellant gas generant system may be employed, but as illustrated herein a monopropellant system is indicated such as may operate on hydrogen peroxide; hydrazine; ethylene oxide; n-propyl nitrate; propyne, or the like. The chamber 30 is arranged to convert the propellant into a high temperature gas which delivers through an annular nozzle 36 against the blades of an auxiliary turbine 38. The turbine 38 drives through a reduction gear box 40, a power shaft 42 which is arranged to be selectively coupled by means of a synchronous clutch 44 under control of an actuator 46, with the forward end portion of the main engine compressor shaft 48.

Figure 8:
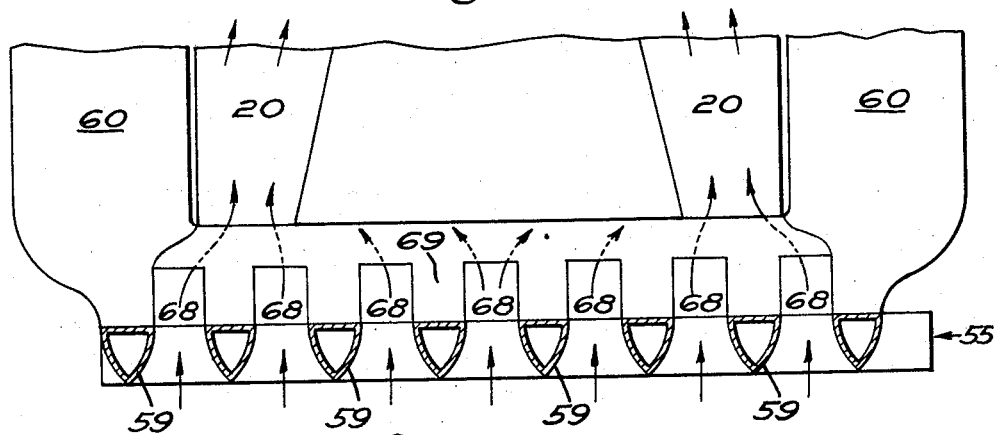

In the engine of the invention, the main turbine-compressor shaft (instead of being a single shaft as in conventional engines) is provided to comprise in-line shaft components 26, 48 which are arranged to be normally engaged by means of a second synchronous clutch as shown at 50, as controlled by an actuator 52. To control the direction of flow of the output of the compressor 18 an air by-pass ring valve 55 (Figs. 4, 5, 6, 7, 8) is employed which consists basically of two flat concentric rings 56, 58 interconnected by wedge shaped radial struts or spokes 59 (Fig. 6), which act as flow guides to direct the compressed air as it leaves the compressor 18 to flow either to the main engine combusion chamber 20 or into a series of auxiliary thrust chambers 60 (Figs. 1–2) which are grouped about the engine casing 61.

Figure 3:
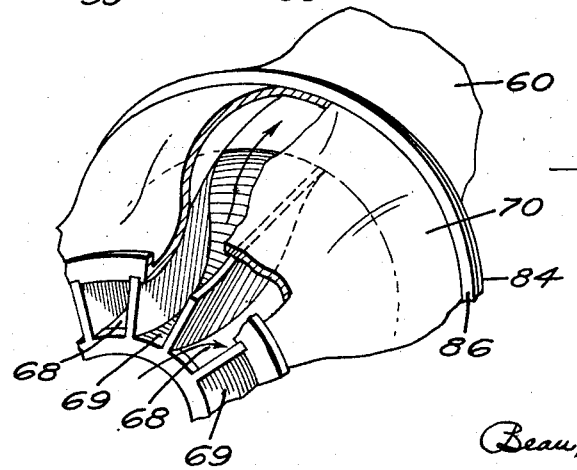
Fig. 3 is a fragmentary perspective view of a portion of the engine conversion valve device of the engine illustrated in Figs. 1–2.

Flow selection is obtained (Figs. 7, 8) by simply rotating the ring valve 55 about the engine longitudinal axis, as by means of an internal ring gear 62 driven by pinion 64 and motor 65 (Figs. 4–5). The valve 55 is journaled within a flange portion 66 of the engine casing in front of a series of flow channels comprising alternately arranged flow ducts 68—69 (Figs. 2, 3, 5, 7, 8) which lead to the main engine combustion chamber 20 and to a manifold 70, respectively. The total cross-sectional dimensions of the flow channels 68 equal those of the channels 69 and are equal to the dimensions of the downstream faces of the spokes 59 of ring valve 55. There are half as many spokes as total flow channels; hence, while one set of flow channels is conducting air flow, the other set is closed off by the spokes.

For the normal or non-augmented operation, the compressor discharge air passes to the combustion chamber 20 where suitable fuel is injected by the fuel atomizers 22. The resulting hot combustion gases pass to the main turbine 24, which supplies the required power to drive the compressor 18 (and any additional accessories (not shown) such as are usually required incidental to normal operation of the engine). Upon leaving the main turbine 24, the exhaust gases pass through the tailpipe 28 and thence through the exhaust nozzle 29 (Fig. 12); thereby producing the normal engine operation jet thrust. In the above described manner, the engine operates as a conventional turbojet engine. To provide this engine with an intermediate degree of thrust augmentation a conventional afterburner can be fitted to the tail pipe 28 as is well known.

However, to operate the engine in high thrust augmentation, the pump 34 is started and thereupon pumps liquid gas generant from the supply tank 32 to the gas generant injector nozzle 31 under high pressure, and thence into the gas generator chamber 30 whereupon decomposition occurs and a high temperature, high pressure gas is formed, as is well known in the art. Selection of the proper chemical gas generant and control of the decomposition reaction within the chamber 30 is of course controlled so that maximum allowable temperature for the gas turbine 38 is not exceeded. This gas is directed by the nozzle 36 to expand through the blades of the multi-stage high speed auxiliary gas turbine 38, and then exhausts into a manifold 72 leading to an exhaust duct 74. If the auxiliary turbine exhaust gas is of combustible nature the duct 74 is preferably arranged to conduct the gas through a conduit 76 to the auxiliary thrust chambers 60 through admission nozzles as indicated at 77 (Fig. 1) where it supplements the fuel supply by the nozzles 80 for economy purposes. However, if the exhaust gas from the auxiliary turbine 38 is non-combustible, the duct 74 will be arranged to discharge the gas overboard as indicated at 78.

The multi-stage auxiliary turbine 38 is connected to a conventional planetary type speed reduction gear box 40 in order to provide a driving shaft speed compatible with that of the compressor 18 at its rated speed. The clutch control system is arranged for selective operation so that for example when the actuator 46 engages the synchronous mesh auxiliary turbine clutch 44, the actuator 52 is connected to cause the synchronous mesh compressor clutch 50 to disengage. The power for driving compressor 18 is then transferred from the main turbine 24 to the gas generator auxiliary turbine 38. Immediately after the clutch 44 is engaged, the by-pass valve 55 (which is normally positioned to direct air flow into the main combustion chamber 20) is now actuated by the motor and gear system 65, 64, 62 to rotate through an angle equivalent to the pitch distance of the flow channels 68—69 so as to divert the discharge air from the compressor 18 into the flow channels 69 and thence into the auxiliary thrust chambers 60. Fuel is injected as by fuel atomizers 80 into the chambers 60, and burned to produce high temperature combustion gas which then passes through exhaust nozzles 82 where it expands to produce the desired high augmentation jet thrust.

Because the chambers 60 can be operated at much higher temperatures than the turbine 24 could withstand, and because the full pressure-ratio from the compressor 18 can be utilized to produce jet thrust at the nozzle 82, the invention results in production of a much higher output thrust when operating through the auxiliary chambers 60 than when operating as a conventional turbojet engine through the chamber 20 and the turbine 24 and nozzle 29. By making use of the gas generator exhaust gas as a fuel through the nozzles 77 the fuel consumption through nozzles 80 can be reduced, resulting in an overall fuel consumption reduction. When the generator exhaust gas is unsuitable as a fuel for the auxiliary thrust chambers 60, the entire fuel requirement is supplied through the nozzles 80.

Figures 1-2 show the auxiliary thrust chambers as being two in number mounted diametrically opposite each other, with incoming air supplied thereto by an annular collector manifold 70. Optionally, the auxiliary thrust chamber arrangement could comprise any other number of individual cans as shown; or it might comprise a single annular chamber surrounding the main engine casing 61 and/or the tailpipe 28.

Another feature of this invention is that the gas generant auxiliary turbine system may be employed as a starter for the engine; thus eliminating need for the usual starter equipment. To use the gas generator as a starter the clutches 44, 50 are engaged and the by-pass valve 55 is set to direct air flow through the combustion chamber 20. Fuel is admitted to the injector nozzles 22, and thus the turbine 24 and the compressor 18 are driven by the gas generator auxiliary turbine 38. When the main turbine 24 and the compressor 18 have attained self-sustaining speed, the clutch 44 is disengaged and the gas generator 30 and the auxiliary turbine 38 are shut down by stopping the pump 34. The engine then continues to operate as a conventional turbojet engine, as explained hereinabove. Or, the engine may be initially started by the generator-auxiliary turbine unit with clutch 50 disengaged, whereby the engine will go immediately into high thrust augmentation operation as explained hereinabove.

To permit an aircraft employing an engine of the invention to take-off and land vertically while in horizontal attitude, the fixed auxiliary thrust chambers as shown in Figs. 1 and 2 are replaced by rotatable can type auxiliary thrust chambers as indicated at 100 in Figs. 9, 10, 11, 12. These chambers may be mounted by means of flanges 84 formed integrally with an annular manifold 85, by clamping or bolting to a flange 86 formed integrally with the engine manifold 70. The manifold 85 is formed with a pair of take-off ports 88 each terminating in a cylindrical end portion 89 provided at its inner surface with a labyrinth seal 90 into which rotatably fits a spoked wheel 92 through the hub of which extends a shaft 94. The shaft 94 also journals in a bearing 96 which is stationary inside the sleeve 89. The thrust chambers 100 are fixed to the outer ends of the shafts 94 and to the rims of the wheels 92, and the shafts 94 are arranged to be rotated to swing the cans (as will be described hereinafter) as by means of gearing 102 and motors 104. The auxiliary thrust chambers 100 are supplied with compressed air from compressor 18 and fuel is admitted through lines 106 and nozzles 108 (Fig. 11). The auxiliary turbine exhaust gases may be included in this fuel feed, if suitable, as explained in connection with Fig. 1. Thus, the auxiliary chambers are now relocated on the underside of the engine, so that they can be pointed downwardly for producing vertical upward thrust, and can be pointed aft or rearwardly for producing forward horizontal thrust. Shifting of the thrust lines of the auxiliary thrust chambers between vertical and horizontal directions is accomplished by simple rotations of the shafts 94; the axes of rotation of the shafts being along lines skewed to the longitudinal axis of the engine proper.

Thus, when pointing downwardly, the auxiliary thrust chambers 100 produce only vertical thrust, which may be used to lift an aircraft while the aircraft and its engine both remain in horizontal or conventional attitude, as illustrated by the solid line showing in Figs. 9, 10, 12. After the aircraft rises to appropriate height the auxiliary thrust chambers 100 may then be rotated slightly, so as to produce both vertical and forward thrust components, thereby causing the aircraft to accelerate forwardly. As the aircraft forward flight speed is increased, lift from the aircraft wing increases, and therefore less vertical thrust is now required to support the aircraft. Further rotation of the auxiliary thrust chambers will then still further increase the forward thrust, and therefore the aircraft velocity and wing lift correspondingly increases until the aircraft is fully supported by its wing. The thrust chambers 100 may now be rotated to produce only horizontal thrust as shown in broken lines in Figs. 10, 12 for maximum forward flight speed. The intermediate positions of rotation of the thrust chambers 100 will produce vertical and horizontal and lateral thrust force components; but inasmuch as the thrust chambers are producing equal and opposed lateral thrust components (because they are being rotated simultaneously) the lateral thrust forces are balanced out and no net side thrust results.

As explained hereinabove, when in horizontal flight the engine may be switched over to normal or basic turbojet engine operation, when so desired, such as during normal cruise flight. However, whenever high thrust augmentation is required, such as during combat, the engine controls are pilot-manipulated so as to cause the engine to operate through the auixiliary thrust chambers 100 while they remain in horizontal attitude.

The aircraft mounting the engine or engines of the invention may land either in the conventional glide landing approach manner with the auxiliary thrust chambers 100 held up in horizontal attitude; or in the alternative a vertical landing may be effected by first converting the engine operation to the auxiliary thrust chamber mode of operation; then causing the auxiliary chambers to rotate into downwardly directed attitude (as shown by the solid line illustration of Fig. 12) whereupon the aircraft will hover over the intended landing site. Or, the pilot may first cause the auxiliary chambers 100 to swing down into vertical attitudes while still inoperative to provide increased drag and reduce forward speed, whereupon the air and fuel supplies may then be switched over to the auxiliary chambers for hovering control. Appropriate pilot manipulation of the engine fuel controls will then regulate the auxiliary thrust chamber outputs so as to permit the aircraft to settle to the ground while remaining in horizontal attitude, under full control of the pilot.

It will of course be appreciated that any suitable control mechanisms, such as schematically shown at 102, may be employed in conjunction with the engine of the invention. For example, a single manual control device may be supplied in the pilot cockpit to set into operation the mechanisms of converting the engine from normal thrust to augmented thrust operation, and vice versa. Thus, simple manipulation of this control device would in turn set into motion the mechanisms controlling the motor through the line 104 driving the gas generant pump 34; the clutch actuators 46—52 as schematically shown at 106 and 108; the conversion valve control motor 65 through the power line 110; and the fuel supply control valves regulating flow of fuel through the nozzles 22, 77, 80; thereby adapting the engine to either normal thrust operation or augmented thrust operation, as called for by the pilot setting of the manual control device. Also, another pilot-operable control will be supplied for adjusting the direction of thrust of the rotatable auxiliary thrust chambers 100 in the vertical-horizontal convertible thrust version of the engine as illustrated in Figs. 9–12.

What is claimed:

1. A jet propulsion engine including a primary combustion chamber, a primary turbine disposed at the discharge of said primary combustion chamber and absorbing an appreciable portion of the energy of the gas discharge from the primary combustion chamber, an air compressor connected to be driven by said primary turbine, an auxiliary combustion chamber having an unobstructed discharge into the ambient atmosphere, means including valve means operable to direct the entire air output from said compressor alternatively either into said primary combustion chamber or into said auxiliary combustion chamber, separate fuel supply means for said primary and said auxiliary combustion chambers, clutch means connected for selective engagement of said primary turbine and said compressor, gas generator means having a discharge jet nozzle, auxiliary turbine means positioned to be driven by the jet discharge of said gas generator means, clutch means connected for selective interconnection of said auxiliary turbine and said compressor, and control means operatively connected to said clutch means and said valve means and selectively operable to cause said primary turbine to drive said compressor while the air discharge from said compressor is directed by said valve means into said primary combustion chamber, and in the alternative to cause said gas generator to drive said auxiliary turbine to in turn drive said compressor while the air discharge thereof is directed by said valve means to flow into said auxiliary combustion chamber.

2. A turbine jet engine including a primary turbine, a primary combustion chamber, an air compressor connected to be driven by said primary turbine supplying air to said primary combustion chamber, an auxiliary combustion chamber, conversion means operable to cause discharge of the total air output from said compressor alternatively either into said primary combustion chamber or into said auxiliary combustion chamber, fuel supply means for said primary and auxiliary combustion chambers, clutch means connected to selectively engage said primary turbine and said compressor, gas pressure generator means, auxiliary turbine means positioned to be driven by said gas generator means, clutch means connected for selective interconnection of said auxiliary turbine and said compressor, and control means operatively connected to said conversion means and said clutch means and operable to cause said primary turbine to drive said compressor while the air discharge from said compressor is directed by said conversion means into said primary combustion chamber, and in the alternative to cause said gas generator to drive said auxiliary turbine to in turn drive said compressor while the air discharge thereof is directed by said conversion means to flow into said auxiliary combustion chamber with the primary turbine disconnected.

3. A jet propulsion engine including a primary combustion chamber, a primary turbine disposed at the discharge of said primary combustion chamber, an air compressor connected to be driven by said primary turbine, an auxiliary combustion chamber having an unobstructed discharge and rotatably mounted upon said engine so as to be swingable between vertically and horizontally directed thrusting attitudes, means including valve means operable to provide selective discharge of air from said compressor either into said primary combustion chamber or into said auxiliary combustion chamber, fuel supply means for said primary and said auxiliary combustion chambers, clutch means connected for selective engagement of said primary turbine and said compressor, gas generator means having a discharge jet nozzle, auxiliary turbine means positioned to be driven by the jet discharge of said gas generator means, clutch means connected for selective interconnection of said auxiliary turbine and said compressor, and control means operatively connected to said valve means and said clutch means and operable to cause said primary turbine to drive said compressor while the air discharge from said compressor is directed by said valve means into said primary combustion chamber, and in the alternative to cause said gas generator to drive said auxiliary turbine to in turn drive said compressor while the air discharge thereof is directed by said valve means to flow into said auxiliary combustion chamber.

4. A jet propulsion engine including a primary combustion chamber, a primary turbine disposed at the discharge of said primary combustion chamber and absorbing an appreciable portion of the energy of the gas discharge from the primary combustion chamber, an air compressor connected to be driven by said primary turbine, an auxiliary combustion chamber having an unobstructed discharge into the ambient atmosphere, means including valve means operable to direct the entire air output from said compressor alternatively either into said primary combustion chamber or into said auxiliary combustion chamber, separate fuel supply means for said primary and said auxiliary combustion chambers, clutch means connected for selective engagement of said primary turbine and said compressor, gas generator means having a discharge jet nozzle, auxiliary turbine means positioned to be driven by the jet discharge of said gas generator means, clutch means connected for selective interconnection of said auxiliary turbine and said compressor, and control means operatively connected to said valve means and said clutch means and operable to cause said primary turbine to drive said compressor while the air discharge from said compressor is directed by said valve means into said primary combustion chamber, and in the alternative to cause said gas generator to drive said auxiliary turbine to in turn drive said compressor while the air discharge thereof is directed by said valve means to flow into said auxiliary combustion chamber, and means for conveying the gas exhaust from said auxiliary turbine into said auxiliary chamber to supplement the fuel supply thereto.

5. A jet propulsion engine including a primary combustion chamber, a primary turbine disposed at the discharge of said primary combustion chamber, an air compressor connected to be driven by said primary turbine, an auxiliary combustion chamber having an unobstructed discharge and rotatably mounted upon said engine so as to be swingable between vertically and horizontally directed thrusting attitudes, means including valve means operable to provide selective discharge of air from said compressor either into said primary combustion chamber or into said auxiliary combustion chamber, fuel supply means for said primary and said auxiliary combustion chambers, clutch means connected for selective engagement of said primary turbine and said compressor, gas generator means having a discharge jet nozzle, auxiliary turbine means positioned to be driven by the jet discharge of said gas generator means, clutch means connected for selective interconnection of said auxiliary turbine and said compressor, and control means operatively connected to said valve means and to said clutch means and operable to cause said primary turbine to drive said compressor while the air discharge from said compressor is directed by said valve means into said primary combustion chamber, and in the alternative to cause said gas generator to drive said auxiliary turbine to in turn drive said compressor while the air discharge thereof is directed by said valve means to flow into said auxiliary combustion chamber, and means for conveying the gas exhaust from said auxiliary turbine into said auxiliary chamber to supplement the fuel supply thereto.

6. A jet propulsion engine including a primary combustion chamber, a primary turbine disposed at the discharge of said primary combustion chamber and absorbing an appreciable portion of the energy of the gas discharge from the primary combustion chamber, an air compressor connected to be driven by said primary turbine, a plurality of auxiliary combustion chambers each having an unobstructed discharge into the ambient atmosphere, means including valve means operable to direct the entire air output from said compressor alternatively either into said primary combustion chamber or into said auxiliary combustion chambers, separate fuel supply means for said primary and said auxiliary combustion chambers, clutch means connected for selective engagement of said primary turbine and said compressor, gas generator means having a discharge jet nozzle, auxiliary turbine means positioned to be driven by the jet discharge of said gas generator means, clutch means connected for selective interconnection of said auxiliary turbine and said compressor, and control means operatively connected to said valve means and said clutch means and operable to cause said primary turbine to drive said compressor while the air discharge from said compressor is directed by said valve means into said primary combustion chamber, and in the internative to cause said gas generator to drive said auxiliary turbine to in turn drive said compressor while the air discharge thereof is directed by said valve means to flow into said auxiliary combustion chambers.

7. A jet propulsion engine including a primary combustion chamber, a primary turbine disposed at the discharge of said primary combustion chamber, an air compressor connected to be driven by said primary turbine, a plurality of auxiliary combustion chambers each having an unobstructed discharge into the ambient atmosphere and rotatably mounted upon said engine so as to be swingable between vertically and horizontally directed thrusting attitudes, means including valve means operable to direct the entire air output from said compressor alternatively either into said primary combustion chamber or into said auxiliary combustion chambers, separate fuel supply means for said primary and said auxiliary combustion chambers, clutch means connected for selective engagement of said primary turbine and said compressor, gas generator means having a discharge jet nozzle, auxiliary turbine means positioned to be driven by the jet discharge of said gas generator means, clutch means connected for selective interconnection of said auxiliary turbine and said compressor, and control means operatively connected to said valve means and said clutch means and operable to cause said primary turbine to drive said compressor while the air discharge from said compressor is directed by said valve means into said primary combustion chamber, and in the alternative to cause said gas generator to drive said auxiliary turbine to in turn drive said compressor while the air discharge thereof is directed by said valve means to flow into said auxiliary combustion chambers.

8. A jet propulsion engine including a primary combustion chamber, a primary turbine disposed at the discharge of said primary combustion chamber and absorbing an appreciable portion of the energy of the gas discharge from the primary combustion chamber, an air compressor connected to be driven by said primary turbine, an auxiliary combustion chamber having an unobstructed discharge into the ambient atmosphere, means including valve means of the annular shutter type flow director operable to alternatively direct the entire air output from said compressor either into said primary combustion chamber or into said auxiliary combustion chamber, separate fuel supply means for said primary and said auxiliary combustion chambers, clutch means connected for selective engagement of said primary turbine and said compressor, gas generator means having a discharge jet nozzle, auxiliary turbine means positioned to be driven by the jet discharge of said gas generator means, clutch means connected for selective interconnection of said auxiliary turbine and said compressor, and control means operatively connected to said valve means and said clutch means and operable to cause said primary turbine to drive said compressor while the air discharge from said compressor is directed by said valve means into said primary combustion chamber, and in the alternative to cause said gas generator to drive said auxiliary turbine to in turn drive said compressor while the air discharge thereof is directed by said valve means to flow into said auxiliary combustion chamber.

9. A turbine jet engine including a primary turbine, a primary combustion chamber, an air compressor connected to be driven by said primary turbine for supplying air to said primary combustion chamber, an auxiliary combustion chamber, conversion means operable to direct the discharge of air from said compressor alternatively either into said primary combustion chamber or into said auxiliary combustion chamber, fuel supply means for said primary and auxiliary combustion chambers, clutch means connected to selectively engage said primary turbine and said compressor, a rocket type generator, auxiliary turbine means positioned to be driven by said gas generator, clutch means connected for selective interconnection of said auxiliary turbine and said compressor, and control means operatively connected to said conversion means and said clutch means and operable to cause said primary turbine to drive said compressor while the air discharge from said compressor is directed by said valve means into said primary combustion chamber, and in the alternative to cause said gas generator to drive said auxiliary turbine to in turn drive said compressor while the air discharge thereof is directed by said valve means to flow into said auxiliary combustion chamber with said primary turbine disconnected, said control means being also operable for engine starting purposes to cause said gas generator to drive said compressor and said primary turbine, while the air discharge from said compressor is directed into said primary chamber and while fuel is admitted to said primary combustion chamber.

References Cited in the file of this patent

UNITED STATES PATENTS

| | | |
|---|---|---|
| 2,577,919 | Roy | Dec. 11, 1951 |
| 2,619,795 | Drake | Dec. 2, 1952 |
| 2,672,726 | Wolf et al. | Mar. 23, 1954 |